Figure 1:
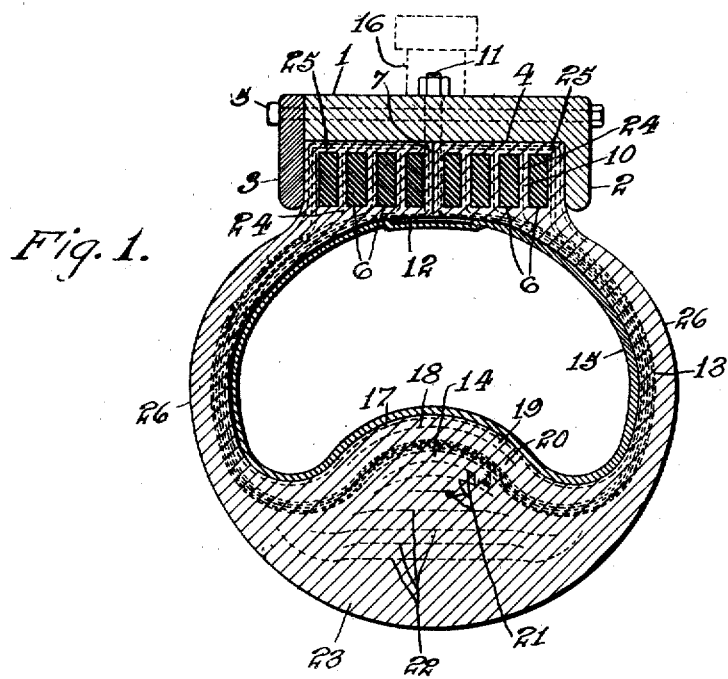

G. LAMBRIGHT.
VEHICLE TIRE.
APPLICATION FILED JUNE 28, 1906.

No. 902,824.

Patented Nov. 3, 1908.

Witnesses
John C. Kopf
Kittie Frankfort

Inventor
Grant Lambright
By his Attorney
B. C. Stickney

UNITED STATES PATENT OFFICE.

GRANT LAMBRIGHT, OF RUTHERFORD, NEW JERSEY, ASSIGNOR OF ONE-HALF TO FRANK A. MAGOWAN, OF NEW YORK, N. Y.

VEHICLE-TIRE.

No. 902,824.          Specification of Letters Patent.          Patented Nov. 3, 1908.

Application filed June 28, 1906. Serial No. 323,874.

*To all whom it may concern:*

Be it known that I, GRANT LAMBRIGHT, a citizen of the United States, residing in Rutherford, in the county of Bergen and State of New Jersey, have invented certain new and useful Improvements in Vehicle-Tires, of which the following is a specification.

This invention relates to pneumatic or inflated vehicle tires, and particularly to those of the detachable type.

It is found that when a pneumatic tire is detachably connected to the rim of a wheel, the tire is liable to be pulled away from its fastenings, when it is subjected to the severe wrenching usually experienced when the vehicle is turning a corner.

One object of my invention is to provide a tire with an improved rim side, which is the base that secures the tire upon the rim. This base I make in the form of a ring or pair of rings built up of a series of smaller rings or cables, which are packed side by side and vulcanized together to make a solid ring or pair of rings of sufficient thickness or substance to form a solid annular wall entirely filling the groove in the wheel rim and intended to be clamped between the usual clamping rings, which form portions of the rim. Not only is the base thus formed solidly clamped between said rings, but small rings or cables which go to form the base are substantially unyielding in longitudinal direction, and a series of these small rings extend entirely across the base, whereby danger of the base working over the clamping rings and the tire becoming loose is avoided. At the same time by removing the detachable clamping ring, the tire may be readily taken from the wheel.

Another feature of my invention relates principally to the tread portion of the tire, and the object of this portion of the invention is to overcome the tendency of the ordinary tire to expand or lengthen circumferentially of the rim, when inflated, thereby becoming easier to rip off the wheel; and I also aim to improve the durability and reliability of the tire, as well as to reduce the liability of the same to puncture.

In the usual tire, the plies of duck are arched at the tread of the tire, in conformity with the general cylindrical contour of the tire, and the tread although usually thick enough to avoid premature wearing out, is still too weak to accomplish the purpose of my invention. Instead of arching the plies of fabric at the tread, as heretofore, I depress them in a manner to form a deep groove longitudinally of the tire, so that in cross section the tubular structure formed by the plies of duck is roughly cordiform; the bore of the tire having approximately the same shape.

The annular mold upon which the tire is built up, has a groove extending along its periphery into which the rubber and fabric plies are depressed during the construction of the tire; and in such depression I apply binding strips, which will not only hold the plies of duck securely during the subsequent vulcanizing operation, but also serve while the tire is in use to prevent longitudinal expansion of the tread portion of the tire. These binding strips are preferably built up alternately with layers of rubber to make the tread of extraordinary thickness, and practically unyielding in longitudinal direction. The strips, the rubber and the fabric taken together form a hoop or annular rib, which is so substantial as to be self-sustaining. When the tire is inflated, this outer hoop or annular rib does not yield to air pressure, so that the tire does not enlarge circumferentially of the wheel, thus avoiding tendency to escape from the rim. Said thickened tread or rib forms an independent support for air pressure. That is to say, it is capable of withstanding, without elongation, a much greater air pressure than is usual in pneumatic tires, and this makes it practicable to employ air pressure to much better purpose than heretofore for compressing the rim side of the tire against the rim of the wheel especially when said rim side is made in the form of a solid continuous base as described herein. In other words the base portion of the tire is placed between two substantial supports, one of said supports being the rim itself and the other being the rib or hoop like thickened thread of the tire, and is securely held by great pressure, said pressure being sustained by said rim, and the other side by said rib or hoop. The greater the air pressure in the tire the tighter will the tire hug the rim.

Another advantage flowing from the herein described construction of the tread is found in the reduced liability of the side walls of the tire to disruption from the air pressure, since the tread or rib portion unsupported is strong enough to take great air pressure without yielding longitudinaly, and hence the side walls are substantially relieved of pressure which is diametrical of the wheel, and which in ordinary tires is due to the necessity of the side walls sustaining substantially all of the air pressure to which the weak tread is subjected.

Figures 2, 3, 4:
Figure 5:
Figure 6:
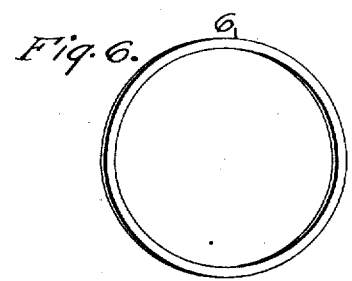
Figure 7:
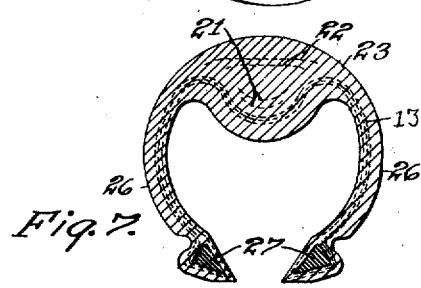

In the accompanying drawings, Figure 1 is a transverse section of an inflated tire embodying my improvements and detachably connected to the rim of a wheel. Fig. 2 is a cross-section of one of the small rings or annular cables which go to make up the rim or base portion of the tire. In this view, the small ring consists of a series of strips placed side by side and vulcanized together. Fig. 3 shows diagrammatically a manner of forming the small rings by folding the fabric; and Fig. 4 shows how the fabric may be coiled for the same purpose. Fig. 5 is a side view of a fragment of one of said small rings, and Fig. 6 shows diagrammatically a perspective thereof. Fig. 7 illustrates the manner of applying some of the improvements to a "clencher" tire.

The rim 1 of the wheel may be of any suitable form, and is illustrated as having side flanges or rings 2, 3, between which is confined the rim portion or base 4 of the tire; said ring 3 being clamped by bolts 5 against the base of the tire, said base making a solid filling for the groove formed in the rim by the flanges 2, 3.

The rim or base of the tire is largely built up of a series of relatively small rings 6, and is preferably divided longitudinally as at 7, for convenience in detaching the tire; four of the rings 6 being shown on each side of said division. Each ring is preferably formed of close woven hard duck or muslin or sheeting in the form of numerous strips 8, Fig. 2, each being secured to the others by a compound 9, which is preferably of a character to make semi-hard rubber, so that the ring may possess considerable rigidity. Moreover the threads of the fabric run longitudinally of the ring, as seen at Fig. 5, so that the same is unyielding, and becomes in effect a cable to hold the tire, upon the rim of the wheel. These small rings are placed closely side by side, Fig. 1, with intervening layers of semi-hard rubber or compound 10; so that at the vulcanizing of the tire, the small rings are vulcanized or united into two wide thick rings, which abut at the middle of the rim at 7. Each of the small rings 6, may consist either of numerous separate strips placed side by side and cemented together, as at Figs. 2 and 5, or the fabric may be formed in successive folds as at 8ª, Fig. 3, or coiled as at 8ᵇ, Fig. 4; but in all cases the threads should run longitudinally of the ring, so as to render the same unyielding.

The usual bolts 11 may be fitted in the rim, and provided on their inner ends with lugs or rings 12 to catch over the adjacent sides of the divided tire; although this securing means need not always be employed.

The walls of the tire embody the usual layers of duck or the like, which form a tubular structure 13, extending along the rim. This tubular structure of fabric is formed with a deep depression 14 extending around the wheel, so that the internal contour of the cover is substantially cordiform or two lobed, Fig. 1, the usual inner or air tube 15 having a corresponding shape and being inflated as usual by means of a valve 16. Preferably after the first or inner ply 17 of duck is laid upon the grooved mold used in constructing the tire, a strip 18 is employed to bind the layer 17 down into the groove of the mold; a layer of rubber 19 preferably intervening between the strip and the duck. Upon the binding strip 18 may be laid a layer of rubber 20, and upon the latter may be placed the remaining plies of the duck 13; all being bound down into the groove of the mold by means of one or more additional binding strips 21, which preferably alternate with layers of rubber, thereby filling up the groove or depression in the tire; and this building up process may continue by employing additional binding strips 22 alternating with layers of rubber, to build up the crown of the tread portion of the tire; a thick layer of rubber completing the tread, as at 23, and forming a thick wearing wall, which it will take a long time to wear away, so that the outermost of the binding strips 22 is not liable to be reached during the life of the tire.

It will be understood that the binding strips taken together contribute materially to the security of this portion of the tire against longitudinal extension due to the air pressure in the tube 15, thereby securing advantages that have been already referred to; while the layers of rubber taken together with the binding strips and the plies of duck 13 form a substantial hoop or rib in the nature of a rim which is self-sustaining against air pressure, and is still sufficiently yielding to exterior pressure to insure an easy riding resilient tire. It will be understood that the binding strips which surround the tire have the effect of binding together tightly the plies of fabric at 14, so that the latter are not liable to become separated in use thereby tending materially to prolong the life of the tire. In order to add still more strength and durability to the tire, I anchor the fabric plies 13 to the rings 6 of which the base of the tire is built up. The end of each of the plies at 13 is carried down alongside of one of the rings 6, as seen at 24. The outer ply or plies are carried as at 25 entirely around the group of rings going to make up each half of the base of the tire; while other plies are carried singly between adjoining rings as at 24, and at the final operation of curing the tire, the tire rings, the duck plies and the intervening layers of rubber and compound are all vulcanized to make a solid structure. By the use of four rings in each half of the tire base, it will be seen that five plies of the duck may be separately anchored in the manner spoken of, while one or more additional plies may be carried around the group of rings thus making a practically indestructible attachment for the ends of the plies of duck, so that no trouble can be experienced from said plies pulling away or becoming loose from the base of the tire. Said base, it will be seen, is of substantial width from side to side of the rim, and therefore affords an extensive surface subjected to the pressure of air in the tire, thereby securely locking the tire upon the rim; there being no liability of the tire elongating or growing larger diametrically of the wheel, because of the longitudinally unyielding character of the binding strips 18, 21 and 22.

The side walls 26 of the tire are sufficiently yielding to preserve the cushioning action of the tire; while the stress upon said walls radially of the wheel is materially reduced owing to the ability of the self-sustaining tread portion of the tire to withstand the air pressure without stretching. It will be seen that the tread portion, for nearly the entire width of the tire, is very much less yielding than the side walls 26 of the tire, and as a result there is some spreading of the side walls when the tire is in action, but a relatively slight yielding of the tread. For this reason, there is a bearing on the full body of air in the tire, or in other words, when the tire yields at all, it must yield for its entire width, instead of only at one small spot in the center, as in the usual thin tread tire. The action of the tire is thereby very much improved. It will be understood that when there is lateral distortion of the tire, as when the vehicle is going around a corner, the tendency is to draw one side of the tire base against the other side thereof, thereby still further reducing the liability of the tire to become separated from the rim.

At Fig. 7 the form and construction of the crown portion of the tire are the same, as at Fig. 1, but the base portions are of the usual clencher type; the duck plies 13 being anchored by carrying them around hard rubber rings 27 formed in the sides of the base.

Variations may be resorted to within the scope of the invention, and portions of the improvements may be used without others.

Having thus described my invention, I claim:

1. A pneumatic tire for vehicles, comprising a single-piece cover in whose base are included annular substantially unyielding strips, the walls of the cover including numerous plies of fabric, all of the plies in said cover being anchored separately upon said strips, a single ply to each strip at each side of the tire.

2. A pneumatic tire for vehicles, comprising a cover in whose base are included numerous annular substantially unyielding strips, the walls of the cover including plies of fabric, said plies being anchored upon said strips, one ply to each strip, the plies and strips alternating with thin layers of semi-hard rubber, the strips, rubber and fabric being vulcanized together.

3. A pneumatic tire for vehicles, comprising a rim portion, a tread portion, and flexible walls connecting said portions; the tread portion being greatly thickened in proportion to the width of the tire, to form a substantially self-sustaining annular rib; fabric extending from the base portion up through the sides, and following the inner contour of the annular rib, and the latter having substantially inextensible flexible bands or strips running along the tire within said rib and binding upon said fabric.

4. A pneumatic tire for vehicles formed of rubber and fabric, the fabric forming a substantial portion of the rim side as well as of the sides and tread of the tire, and being substantially in the form of a multiple ply annular tube having a longitudinal depression in its periphery; and a plurality of binding strips in said depression extending around the tire.

5. A pneumatic tire for vehicles formed of rubber and fabric, the fabric forming a substantial portion of the rim side as well as of the sides and tread of the tire, and being substantially in the form of a multiple ply annular tube having a longitudinal depression in its periphery; and a plurality of binding strips in said depression extending around the tire, said strips alternating with layers of rubber; the strips, rubber and fabric forming a greatly thickened tread, which is thickest at its middle portion, and constitutes a self-sustaining annular rib.

6. A pneumatic tire for vehicles, comprising a cover of fabric and rubber, the fabric being substantially in the form of a multiple ply annular tube having a longitudinal depression in its periphery, so that the inner contour of the tube in cross-section is cordiform in shape; the tread being built up outwardly from said depression with alternating rubber and strips of binding material until an arched outer contour of the cover is formed; said binding strips extending longitudinally of the tire.

GRANT LAMBRIGHT

Witnesses:
B. C. STICKNEY,
JOHN C. KOPF.